(12) United States Patent
Marocchi et al.

(10) Patent No.: US 8,195,215 B2
(45) Date of Patent: Jun. 5, 2012

(54) METHOD AND SYSTEM FOR FORMING A COMMUNICATION GROUP FOR CONTENT DISTRIBUTION RELATED TO AN EVENT

(75) Inventors: James A. Marocchi, Winfield, IL (US); John C. Kay, Elgin, IL (US); Daniel J. Naylor, Inverness, IL (US); Hemang F. Patel, Hoffman Estates, IL (US); Marianne J. Stanke, Elmhurst, IL (US); Deborah J. Monks, Palatine, IL (US); Rod N. Averbuch, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 674 days.

(21) Appl. No.: 12/338,186

(22) Filed: Dec. 18, 2008

(65) Prior Publication Data

US 2010/0159976 A1 Jun. 24, 2010

(51) Int. Cl.
H04B 7/00 (2006.01)

(52) U.S. Cl. .......................................... 455/521; 455/519

(58) Field of Classification Search ................... 455/521, 455/520, 556.1, 519; 717/161, 124, 127; 370/254

See application file for complete search history.

(56) References Cited

U.S. PATENT DOCUMENTS

| | | | |
|---|---|---|---|
| 7,865,887 B2 * | 1/2011 | Kaiser et al. ................... | 717/161 |
| 2003/0187749 A1 | 10/2003 | Peled et al. | |
| 2004/0267865 A1 | 12/2004 | Cuervo | |
| 2005/0192004 A1 * | 9/2005 | Witzel et al. ................... | 455/428 |
| 2006/0067502 A1 * | 3/2006 | Bamrah et al. ............ | 379/211.02 |
| 2006/0089938 A1 | 4/2006 | Leonard et al. | |
| 2007/0002834 A1 | 1/2007 | Taylor | |
| 2007/0036100 A1 | 2/2007 | Shaffer et al. | |
| 2007/0036118 A1 | 2/2007 | Shaffer et al. | |
| 2007/0037596 A1 | 2/2007 | Shaffer | |
| 2007/0173273 A1 * | 7/2007 | Gogic ............................ | 455/518 |
| 2008/0106600 A1 * | 5/2008 | Benco et al. ................... | 348/157 |
| 2008/0144525 A1 * | 6/2008 | Crockett et al. .............. | 370/254 |

OTHER PUBLICATIONS

PCT International Search Report Dated Jul. 8, 2010.
International Preliminary Report on Patentability for International Application No. PCT/US2009/067959 mailed on Jun. 21, 2011.
Written Opinion of the International Searching Authority for International Application No. PCT/US2009/067959 mailed on Jul. 8, 2010.

* cited by examiner

*Primary Examiner* — Peguy Jean Pierre
(74) *Attorney, Agent, or Firm* — Valerie M. Davis; Kenneth Haas

(57) ABSTRACT

A method and system is implemented to form a communication group comprising a plurality of entities. The method includes receiving a resource manager state generated for an event and extracting a plurality of parameters that indicate resource availability based on the resource manager state. The method further includes applying a set of rules to the resource state and to the plurality of parameters to select resources to form a communication group comprising a plurality of entities to distribute content related to the event.

18 Claims, 2 Drawing Sheets

METHOD AND SYSTEM FOR FORMING A COMMUNICATION GROUP FOR CONTENT DISTRIBUTION RELATED TO AN EVENT

FIELD OF THE DISCLOSURE

The present disclosure relates generally to a communication system and more particularly relates to forming a communication group of entities in the communication system to optimize content distribution to the entities as relates to an event.

BACKGROUND

In an event, such as an emergency situation or service request (also referred to herein as an incident), responding workers and resources (e.g. police, fire fighters, utility workers, transportation vehicles, military personnel, etc.) may be called in to address the situation. Moreover, it is further known that different event responder resources may use different communication networks such as, for instance, different private radio networks or may use different communication means such as voice talk groups, multimedia data groups, etc. The communication networks can also vary in resource availability based upon multiple factors including, but not limited to, network load, bandwidth partitioning, priority, as well as the geographical location of the user.

During the event, there is a need to dynamically identify resources, relevant content, and proper communication links with groups that need to participate in the event related activity. However, existing methods teach about generation of virtual communication groups based only on the location of endpoint devices that are connected to these different communication networks, not taking into consideration other factors that bear on communication group formation.

Therefore, there exists a need for a method and system to form a communication group for optimizing content distribution related to an event across one or more communication systems and one or more groups of users.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate various embodiments of concepts that include the claimed invention, and explain various principles and advantages of those embodiments.

Figure 1:
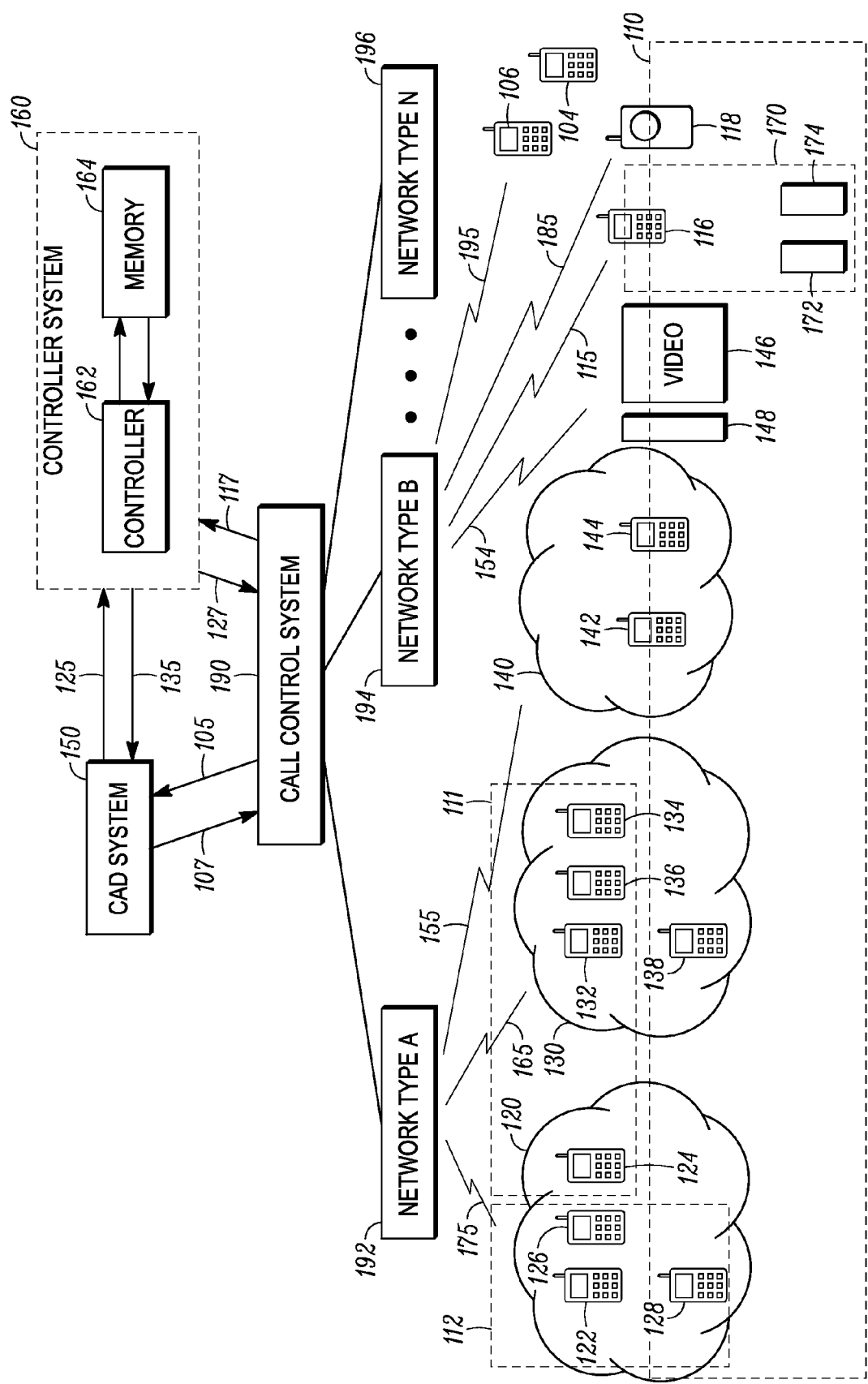
FIG. 1 is a system diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments a method for forming a communication group of entities is described. The method includes receiving indication of an event, which can include receiving a resource manager state (such as a Computer Aided Dispatch (CAD) state) generated for an incident, or receiving an indication resulting from a user or device initiated action that indicates the initiation of the event; and extracting, based on the CAD state, a plurality of parameters that indicate both network and non-network resource availability. The method further includes applying a set of rules to the CAD state and to the plurality of parameters to select both network and non-network resources to form a communication group comprising a plurality of entities to optimize content distribution related to the incident. As the term is used herein, a network resource is a physical resource over which media and control information is transported and is associated with network characteristics parameters as subsequently described. A non-network resource can comprise all other resources, e.g., personal, devices, sensors, etc.

Stored and dynamically generated parameters, including device characteristics parameters, network characteristics parameters, and user characteristics parameters, are extracted based on the resource manager state, and the set of rules are applied to these parameters (including to prioritize one or more of the parameters) to enable effective, efficient, and personalized delivery of content related to the event to various users, groups of users, and devices involved in the dynamically created communication group. Moreover, the communication group can be dynamically modified based on a change in the extracted parameters, as well as a change in work group makeup. Users involved in the communication group can be attached to one or more access networks, and can be utilizing devices of varying capabilities. Configured preferences, as well as dynamically created inputs, are incorporated into the decision making to enable resolution of conflicts where roughly equivalent functionality can be obtained through multiple options for deployment. Those skilled in the art will realize that the above recognized advantages and other advantages described herein are merely illustrative and are not meant to be a complete rendering of all of the advantages of the various embodiments.

FIG. 1 illustrates a diagram of a communication system 100 in accordance with some embodiments. For purposes of the teachings herein, a work group is defined as resources assigned by a resource manager (also referred to herein as a resource management entity) for a particular event and can include resources such as personnel, sensors, cameras, vehicles, content sources (e.g., databases) and other non-network resources needed to respond to an event. A resource management entity upon learning of an event generates a "state" or various information related to the event and enables formation of one or more work groups for the event. The resource management entity in the following description is referred to as a Computer Aided Dispatch (CAD) system. However, alternative embodiments of a resource management entity include, but are not limited to, a work order management system or customer service system to name a few.

In addition, a communication group is defined by the entities (which can include devices used by all or portions of the assigned work groups) and network resources (e.g., RF resources) that are set up and utilized by members of the work groups for the purposes of transporting information related to the event. The communication group is configured based on a number of factors that are subsequently described, and the communication group can take many forms such as a voice group, a data group, a multimedia group, a teleconference, etc. Communication groups are formed within the bounds of resource availability as described by reference to some illustrative embodiments.

Turn back to the details of FIG. 1, the communication system 100 includes a controller system 160, a resource management entity (in this case a CAD system) 150, and a call control system 190. The "call" control system 190 comprises one or more call controlling functions that provides coordination of communication (e.g., voice "calls", media exchange, such as video, etc.) between members of a communication group. The communication system 100 further includes a number of networks, including a Network Type A 192, a Network Type B 194 through a Network type N 196 having one or more infrastructure devices that serve as an intermediary for communications between the devices used by the resources of the various work groups in the system. Accordingly, the networks can include, but are not limited to, equipment commonly referred to as zone controllers, base station controllers, repeaters, base radios, base stations, base transceiver stations, access points, routers or any other type of infrastructure equipment interfacing a communication device or content source in a wireless or wireline environment.

Moreover, the networks can be configured as a 2G, 3G, or 4G network using communication technologies including, but not limited to, Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Single Carrier Frequency Division Multiple Access (SC-FDMA), Discrete Fourier Transform-Spread Orthogonal Frequency Division Multiplexing (DFT-SOFDM), Interleaved Frequency-Division Multiple Access (IFDMA), Worldwide Interoperability for Microwave Access (WiMax), Long-Term Evolution (LTE). These wireless communication technologies enable the utilization of applications including, for example Push to Talk (PTT, i.e., for communicating voice), Push to Talk over Cellular (PoC), Push to X (PTX, i.e., for communicating voice and/or other media such as images or video) and other communication technologies.

Turning again to FIG. 1, system 100 further includes a plurality of groups 120, 130, 140 comprising multiple communication devices that are used by members of work groups assigned by the CAD system 150, and dynamic communication groups 110, 111, and 112 that are formed in accordance with the teachings herein. The communication system 100 further includes a sub-group 170 formed in accordance with the teachings herein. Also shown is a plurality of communication entities, which include a number of wireless communication devices and a remote input device 118 (such as a remote sensor, a camera, or a database) shown communicatively coupled, through Network Type B 194 via a communication link 185, to call control system 190 for communicating with the CAD system 150, the controller 162, and/or other entities in the network.

Furthermore, wireless communication devices 104, 106 are shown communicatively coupled, through Network Type B 194 via a communication link 195, to the call control system 190 for communicating with the CAD system 150, the controller 162, and/or other entities in the network. A wireless communication device 116 is shown communicatively coupled, through Network Type B 194 via a communication link 115, to call control system 190 for communicating with the CAD system 150, the controller 162, and/or other entities in the network. Wireless communication devices 122, 124, 126, 128, 132, 134, 136, 138, 142, 144 are shown communicatively coupled, through Network Type A 192 via communication links 175 and 165, to the call control system 190 for communicating with the CAD system 150, the controller 162, and/or other entities in the network. Wireless communication devices 146 and 148 are shown communicatively coupled, through Network Type B 194 via communication link 154, for communicating with the CAD system 150, the controller 162, and/or other entities in the network. Wireless communication devices 172 and 174 are shown communicatively coupled through wireless device 116. Some of the entities are included in one or more of the groups 110, 111, 112, 120, 130, 140, and 170, and some of the entities are standalone units that may be, for example, used by public safety personnel to respond to other events.

The CAD system 150 communicates with the control system 190 via communication links 105 and 107 and communicates with the controller system 160 via communication links 125 and 135. The controller system 160 further communicates with the call control system 190 via communication links 117 and 127. As used herein, communication links are the physical resources over which information is sent between the devices within system 100 and can comprise wired links or wireless links. If the communication links comprise wireless links, the corresponding physical resource is an allocation of radio spectrum that is partitioned into radio frequency (RF) carriers that are modulated by information comprising a control stream or a media stream (also referred to herein as content), which can include for example, data, voice (audio), video, etc.

The controller system 160, CAD system 150, and the call control system 190 are illustratively shown as separate physical entities. However, depending on the particular implementation scenario one or more of these systems may be physically co-located or consist of multiple physical elements. The controller system 160 may be integrated with a resource management application (e.g., in system 150), the call control system 190, or may be a separate entity interfacing to both, such as a message switch. The resource management application may be a CAD application, typically used by public safety, transportation, and military organizations; a work order management application, typically used by field service personnel and government service organizations; or other resource management application. The call control system 190 may be a zone controller as part of a land mobile radio system, a call processing server such as PTT over cellular server used as part of a cellular carrier system, a video communication controller, or other communication system controller. The call control system 190 may consist of multiple call controllers used to control a variety of network and communication types.

The controller system 160 includes a memory 164 communicatively coupled to a controller 162, which comprises one or more processors coupled, for example, via a wired (e.g., serial cable) connection to the call control system 190 and the CAD system 150. Further, in one embodiment, memory 164 can be at least partially physically co-located with the controller 162. However, in another embodiment memory 164 can be at least partially positioned external to the controller system 160 at a different location as part of a database and may be connected to the controller 162 via a suitable communication link. Therefore, memory 164 may comprise a single physical memory element in one physical location or multiple memory elements in one or more physical locations. Memory 164 stores a set of rules and stores any combination of device characteristics parameters, user characteristics parameters, and network characteristics parameters that indicate resource availability such as, for instance, manpower availability, RF resource availability, and device resource availability. The set of rules comprises, for example, an algorithm utilized by the processor within controller 162 to extract a plurality of parameters based on the CAD states (which can be extracted from memory 164 and/or from the content of the CAD state) and apply the set of rules to the CAD state and the extracted parameters to form, e.g., the communication group 110.

The entities 104, 106, 116, 118, 122-128, 132-138, 142-148, 172, and 174 are located at different positions in the communication system 100. Each of these entities establishes a communication link for communicating information (which can include voice, data, video, control information, etc.) across the networks 192, 194, 196, utilizing the call control system 190, which in turn transports said information to the controller system 160, and/or to the CAD system 150. The entities communication with one another and/or with the controller system 160 and/or the CAD system 150 across the networks 192, 194, 196, utilizing the call control system 190. The call control system 190 and networks 192, 194, 196 configurations depend on the communication protocols used in the system.

In accordance with the teachings herein, the entities within communication system 100 are selectable to form communication groups to distribute content related to an event. In an embodiment, an entity in the communication system 100 is a physical device such as: one or more sensors used to measure various parameters in the system such as temperature, humidity, toxin levels, etc.; a video, a still picture camera, or a database.

In an embodiment, a communication entity is a wireless communication device also commonly referred to as a radio, a mobile station, a subscriber unit, a PDA, a cell phone, a laptop or any similar device that can transmit and receive information bearing signals. In another embodiment, an entity is a user of a physical device in the communication system 100.

The wireless entities are configured to operate according to one or more different 2G, 3G and 4G wireless communication technologies depending on the particular network through which the entity communicates. In one embodiment, the entities are configured to transmit/receive communication content from one network to another network, which may be of the same or a different type. For example, communication content may be transmitted from a LAN (local area network) to a GSM network. In another embodiment, the entities may communicate with each other using short range technology. Examples of short range RF technology include Bluetooth, Wi-Fi, Zigbee and similar protocols. Accordingly, the entities and the networks 192, 194, 196 wirelessly communicating with those entities have over-the-air interfaces such as 802.11 or Evolved UMTS Terrestrial Radio Access Network (E-UTRAN) and further include a physical transceiver, i.e., transmitter and receiver apparatus (not shown), as part of the wireless interface used to transmit and receive information in the network. The transceiver, memory and processors can have any suitable physical implementation and are topologically coupled depending on the particular device implementation.

As illustrated, the groups 140, 130, 120 each comprise a group of entities that form respective communications groups. Each group 120, 130, 140 may comprise, for instance, the subscriber units used by members of a talkgroup, with each talkgroup being associated with a different first responder team (e.g., police, fire department, hospital personnel) depending on the type of event. In this illustrative embodiment, group 120 includes entities 122 to 128; group 130 includes entities 132 to 138; and group 140 includes entities 142 and 144. The entities within a group, e.g., 120, 130, 140 may directly communicate with each other. As further illustrated, entities from one or more groups can be a part of one or more communication groups formed in accordance with some embodiments. For example, as shown in FIG. 1, entities 128, 138, 142, 144, from the groups 120, 130, 140 are selected to, in part, form the communication group 110. Additional entities 116, 118, 146, 148, and 172 and 174 (included in sub-group 170) are selected to form the communication group 110 as next described with respect to FIG. 2.

Figure 2:
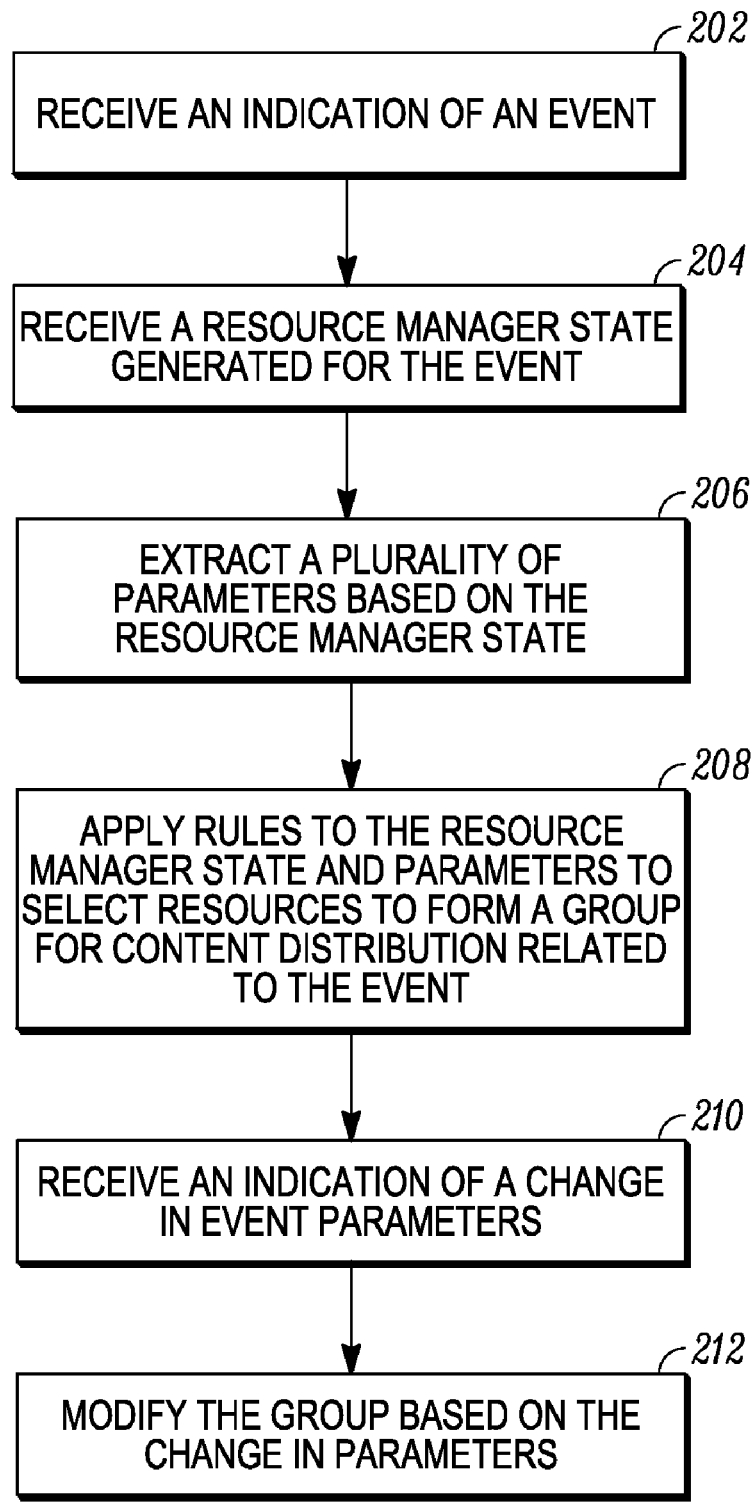
FIG. 2 is a flow diagram of a method for forming a communication group of entities in a communication system in accordance with some embodiments.

FIG. 2 is a flow diagram of a method 200 for forming a communication group having multiple entities in accordance with some embodiments. Method 200 includes functionality that may be performed in hardware, firmware, software or a combination thereof and may further be performed at a single hardware device or a combination of hardware devices in a system. Also, one or more steps of method 200 can be performed at supporting hardware units external to the system. In the described illustrative embodiment, much of the functionality of method 200 is performed in the controller system 160 with some supporting functionality being performed in other systems such as the CAD system 150, the networks 192, 194, 196, and the call control system 190.

In accordance with the method 200, an indication of an event is received (202) and communicated to the CAD system 150, which generates a CAD state for the event. One embodiment of an event is a public safety incident that is defined herein as an unplanned occurrence or event necessitating a response, and in most instances an immediate response as in the case of any type of emergency situation. A public safety incident includes, but is not limited to, a crime (e.g., bank robberies, terrorist attacks, shootings), an emergency medical situation, a hazardous material spill, a natural disaster (e.g., tsunami, hurricane, wildfire, earthquake), and a manmade disaster (vehicle crashes, structural fires, plane or train crashes), to name a few. The indication of an event can be provided in any suitable form such as in a message format controlled by the implementation of a standard or proprietary protocol. The indication may also include some form of physical indication such as a visual indication (a colored or flashing light) or an audio indication (a siren or bell) to alert someone in the geographical vicinity of the event.

In one embodiment, the controller 162 receives the event indication through its interface with either the call control system 190 or the CAD system 150, and passes to its processor the indication of the event, and in another embodiment the CAD system receives the indication of the event. For example, an emergency incident 180 (e.g., an explosion at a chemical plant) occurs, and a police officer in the vicinity of the explosion presses a PTT button on his radio 116 to report the explosion, and the call control system 190 and network type B 194 facilitates the set-up of communication link 115 and also indicates the incident to the controller 162, which requests and receives (204) in response to the request a CAD state for the incident 180.

In another implementation scenario, the police officer uses his radio 116 to call a dispatch facility via the communication link 115 to indicate the explosion 180, and an operator at the dispatch facility manually enters information into the CAD system 150, which then automatically generates and sends the CAD state to the controller 162. In yet another implementation scenario, in anticipation of such an incident at the chemical plant, a temperature sensor 118 is installed in the plant and is communicatively connected to the CAD system 150, which under emergency situations alerts the controller 162 when the temperature in the plant exceeds a certain temperature threshold. In addition, the CAD system 150 determines, based on the temperature threshold being exceeded, that the plant floor layout diagram is to be delivered to the responders on the scene. The CAD system 150 then initiates, using the controller 162, the delivery of the floor layout as an image to the responders.

In yet another implementation scenario, a citizen using a multimode device (e.g. a Personal Digital Assistant (PDA)) initiates a call to E911, providing E911 with voice and an image related to a particular event. Dispatch determines that the image and a voice description (from the citizen) are to be distributed to those responders that are handling the event. The CAD system 150 indicates to the controller 162 that an image and a voice stream are to be transmitted to a group of responders, e.g. group 110. The controller 162 enables the transmission of the image and voice stream utilizing the call control system 190, and the network type A 192 and network type B 194 communication links to the respective devices.

In the above-described implementation scenarios, the incident 180 was indicated by a voice communication (from the police officer), by pressing a button (in this case a PTT button on the officer's radio), and by a monitored parameter (e.g., temperature or any other suitable parameter such as toxin level) exceeding a threshold. Other illustrative ways of generating the indication of an event include, but are not limited to, activating a switch (such as a switch to turn on a siren), and via a user interface (such as the police officer contacting the dispatch facility or his local police station via a keyboard on his Personal Digital Assistant (PDA). Also, with respect to monitoring a parameter, the monitored parameter could comprise monitoring a video and detecting an object or event in a video that triggers the indication of an event. Moreover, a plurality of parameters might be monitored and an indication of an event triggered based on some combination of the monitored parameters.

The CAD state that is generated by the CAD system 150 and received (204) at the controller 162 includes information about and related to the event 180 that the controller 162 can use to generate one or more communication groups to distribute content related to the event, for instance so that responders at the scene can monitor and attend to the event. In one embodiment, the CAD state includes at the least one of or a combination of an event identifier, an event type, an event priority, and resource assignment based on the event type. The event type may be any kind of incident such as a fire, a burglary, a traffic accident, and the like. The event identifier (e.g., an incident identifier (ID)) identifies a particular event and may be a statically assigned identifier based on the event type or may be a dynamically generated identifier that is unique for each reported event. For example, the event identifier for fire in a house may be 556 and the identifier for fire in a factory may be 558. The resource assignment may be the worker role associated with the event. For example, the resource assignment for a fire incident 556 may include 3 fire workers, 1 doctor, 2 nurses, a policeman, and a supervisor.

The CAD state may also include other information related to an incident such as, user status (e.g., accepted call, en route, on scene, etc.); content that needs to be distributed to work group members based on role; pending calls; vehicle states (e.g., location relative to an event, users in vehicle or away from vehicle, number of officers in vehicle, network coverage in vehicle, etc.); device state (e.g., services (PTT, telephony, data), users of the devices,); an indication of one or more work group(s) called to the scene (e.g., SWAT, fire department, police, Emergency Medical Services (EMS), etc); and one or more policies or rules regarding utilization/allocation of non-network resources, worker roles, or content. The controller 162 may select all, some, or none of the devices used by work group members to form the dynamic communication group and uses the other CAD state information to distribute content regarding the incident.

As an event progresses and the CAD state changes (e.g. work group is modified or new content is available for distribution) the CAD state updates are sent to the controller 162 and the controller 162 may select all, some or none of the devices used by the updated work groups to modify the initial communication group or establish additional communication groups to optimize content distribution. It should be further noted that changes or updates to the CAD state could also be performed by the controller 162 (based on for instance needs of work group members while at the scene of the event) and communicated to the CAD system 150.

In the above example regarding the explosion 180, the CAD state indicates the event type as a chemical explosion; includes a specific incident ID for incident 180; sets the event priority to high due to the potential hazard (from the chemicals themselves or from a fire) to the emergency responders as well as civilians inside and outside the chemical plant, wherein a high priority sets as associated policy of using high quality links with a high Quality of Service and can affect how bandwidth is allocated within the attached networks; provides resource assignments based on the incident being a chemical explosion; provides some policies for selecting some entities to form the dynamic group.

For example, one or more CAD systems 150 dispatch the fire department, the police department, and an ambulance to the scene. The CAD state indicates that group 140 is on the scene and comprises members of the fire department, including the fire chief (who assumes the role of incident scene commander and has a high user priority of receiving audio and video due to potential risks of toxic chemical release) and three other firefighters. The CAD state further indicates that group 130 is en route and comprises two members of the police department in a squad car, and indicates that group 120 includes three EMS workers in an ambulance en route to the scene. The CAD state also indicates that the police officer with device 116 is already at the scene.

The CAD state could further provide the example policies: send high resolution still to officer at the scene in his vehicle, low resolution still to perimeter users on foot, and create a teleconference to discuss; and do not send an audio stream to a car outside of a certain geographical radius, just deliver low quality video. Moreover, the controller 162 could include information about the devices and networks (in this case an LTE network and an Association of Public Safety Communication Officials International (APCO) Project 25 (P25) network) being used by the members of the groups dispatched to the scene. For instance, the controller 162 could have knowledge (e.g., via the call control system 190 and/or the networks 192, 194, 196) that: the fire chief has a multimedia device 142 for LTE and a P25 radio; firefighter 1 has a multimode P25/LTE device 144; firefighter 2 has a video camera 146; firefighter 3 is on the truck with an LTE handheld display and an LTE laptop 148; the police officer at the scene has a P25 radio 116, an LTE laptop 172 in the vehicle, and a multimode P25/LTE PDA 174 in the vehicle; the ambulance workers each have P25 radios 122, 124, 126 and also have an LTE laptop 128 in the ambulance; the two police responders each have P25 radios 132, 134; one has a LTE multimedia device 136, and there is a LTE laptop 138.

After receiving the CAD state, and with knowledge of the devices and their respective states, the controller 162 extracts (206) a plurality of parameters based on the CAD state, and applies (208) a set of rules to the CAD state and to the plurality of parameters to select resources to form a communication group comprising multiple entities to distribute content related to the incident. In the above example, the controller 162 may create a voice radio communications group that includes all devices used by non-network resources assigned to the event, a second voice radio communications group for all devices used by police involved in the event, and a third voice radio communications group for all devices used by fire workers assigned to the event. The controller 162 may also prioritize a parameter based on the set of rules and use the prioritized parameter to optimize content delivery to the communication group, for example by selecting a particular communications service, e.g., PTT, data, etc. to deliver the content.

In one example, the plurality of parameters is extracted from a memory internal to the controller. In another example, the plurality of parameters is extracted from a memory external to the controller. The parameters may also be extracted from the information in the CAD state, from the devices in the system, from the networks themselves (e.g., from infrastructure devices and servers within the network). The plurality of parameters indicates resource availability (e.g., personnel, devices, vehicles, network resources, content resources, etc., that the controller 162 learns of through the CAD system 150, the call control system 190, Networks 192, 194, 196, or directly from other sources such as directly from content sources) and may include a device characteristics parameter, a user characteristics parameter, and a network characteristics parameter.

In general, the device characteristics parameter may indicate a device capability (e.g. capable of receiving video, vocoders/codec, etc.), a device battery state (e.g., low), a device identity (e.g. International Mobile Equipment Identity (IMEI) number), a device availability (e.g., busy status), a device location (e.g., using GPS technology or some other type of tracking technology), or an association between a plurality of devices (e.g., parent/child relationships) that can be static or change over time. The network characteristics parameter may indicate a network service capability (e.g., capable of supporting telephony, data, PTT, etc.), network transport capability (e.g., unicast vs. multicast, throughput, over the air congestion, latency, signal strength, backhaul availability, congestion state, capacity or core network bandwidth availability, etc.) a network security level (e.g., high, low), network availability, cost of network transport, or quality of network transport. The user characteristics parameter may indicate a user's availability, a user's credentials (e.g., security credentials, authorized to have access to certain content, manual user override, etc.), a user's identity, a user's location, a user's role (e.g., doctor, policeman), or a user's state (e.g., en route, on the scene, etc.).

With regards to the rules and policies that the controller 162 uses to select the content shared with the communication group, as well as the means by which the content is distributed within the communication group. The rules and policies can be preprogrammed, provided dynamically, manually entered as an event occurs, or a combination thereof that specify outcomes that affect the selection of content distributed to the communication group. Some general outcomes can include, for example: least common denominator—all get minimal data; few selected individuals get all content, others get nothing; all get something, but each may be of different quality/bit rate; information is customized based upon device type, or CAD state; content is customized based upon network availability; information delivered via unicast or broadcast; real-time (or near-real time) adjustments based upon network conditions, etc.

More particular outcomes from the rules can include: determination of vocoding/video resolution on a group or a per-user basis; determination of content delivery based on inclusion of new device(s) into pool of devices capable of participating in the communication session, to occur at session initiation or mid-session; dynamic allocation of additional (or reduced) network resources for media transport, including class of service, delivery priority, bandwidth; determination of group transport based on network and user status, both at session initiation and mid-session (e.g., utilization of multicast/broadcast vs. multiple unicast flows); determination of network (or networks) used to delivery media to user(s) or group based on throughput or other quality metric (e.g. latency, dropped packet rate, etc.) for the subject networks; determination of optimal network transport based on network availability or reliability statistics or history; determination of device configuration, device software status or upgrade necessity, network configuration based on statically configured or dynamically updated inputs from devices and networks; determination to reconfigure group membership to satisfy high priority users within the group when transport resources become constrained or under normal operations, for example raise video quality for high priority users or groups and/or lower video quality for low priority users; provide a higher quality video to high priority users in the group and forcing other users out of the group session to maintain high quality video to high priority users; provide high priority traffic to high priority users on a high priority or high quality network, move low priority traffic to alternate networks; determination of device delivery when a device to device relationship (e.g. parent-child relationship) exists, and both devices have capability to participate in the service, for example the user has multiple devices—a P25 voice radio and a broadband handheld device.

As stated above, the controller 162 applies the rules to the CAD state and the extracted parameters to select an initial set of entities to include in the communication group to optimize distribution of media related to the incident in the communication group. With respect to the illustrative chemical explosion incident 180, upon arriving on the scene, the fire department chief confirms that this incident is going to require the assignment of a high priority communications flow for the video stream, from which is originating from device 146, and is communicated to the CAD system 150, utilizing the call control system 190 and network type B 194, via links 154 and 105, and further communicated to the controller 162 via link 135.

The controller 162 initiates a communications group for all the responders already on the scene, e.g., the police officer who reported the incident and the fire fighters in group 140, to distribute audio over the P25 network, so that they can view each other's location. The controller further determines based upon policy received in the CAD state that the fire chief should be sent high quality video being captured by video source 146, that the firefighter in the truck has two devices that can receive video so only one device is selected for the receiving the video; and that a lower quality video only is to be sent to the ambulance and the police car based on their distance from the incident until the vehicles are within a certain geographical range of the incident. The LTE network is selected for streaming the video.

Accordingly, controller 162 initially selects as entities in the communication group 110: the video camera 146 for streaming video to other devices in group 110; the fire chief's multimedia device 142 that can receive both audio and the high quality video; the laptop 148 of firefighter 3 is selected (from his two devices) to receive high quality video so that it can be streamed to other devices or to the CAD system 150 for distribution; firefighter 1's multimode device 144 is selected to receive the audio and the video; the radio 116 of the police officer on the scene is selected to receive audio; the laptops 128 in the ambulance and 138 in the police car en route are both selected to receive a lower quality video until they get closer to the scene, wherein those responders can also receive audio and a higher quality video; and the sensor 118 for providing continuing updates of the temperature level at the plant to provide to the responders on the scene. The controller 162 can invite the devices to participate in a communication session with multiple forms of media using protocols that include, but are not limited to, Network Layer protocols (such as well known Internet Protocols version 4 and 6) and/or Session Layer protocols (such as well known Session Initiation Protocol (SIP)).

The teachings herein are not limited to dynamically forming a single group for distributing the content but can be extended to form groups within the group 110 (e.g., "sub-groups"). In a particular sub-group, all entities can have at least a common set of parameters. The common set of parameters can include, but is not limited to device capabilities, device locations, device battery state, and user role. For example, the controller 162 can select a set of entities amongst the devices which have video capability to form a sub-group in which the devices can share video with each other. In another example, the controller 162 selects devices within proximity of each other to form a sub-group to enable direct wireless communication, such as BLUETOOTH communication between the selected entities. In a further embodiment, controller 162 chooses to create a voice only group 111 including devices from existing groups 120 and 130, which include device 124, 132, 134 and 136. In a further embodiment, controller 162 determines that a sub-group 112 is needed which is a subset of the members of the group 120. The devices 122, 126 and 128 are grouped as a sub-group according to the description above.

In another embodiment, the controller 162 selects entities based on the associations between the plurality of entities to form a sub-group of entities. For example, the controller can select entities used by a single user to form a sub-group. In the chemical explosion 180 scenario, the entities 172 and 174 are selected to form a sub-group with entity 116 since they are all being used by the officer at the scene. In another example, the controller can select a set of parent entities to form a sub-group. In general, parent entities are first layer entities which have substantially higher capabilities and/or substantially important roles related to the resources required for the reported incident. Similarly, the controller 162 can select a set of child entities to form another sub-group. In general, child entities report to at least a parent entity, and they have substantially lower capabilities and/or roles related to the resources required for the reported incident. In one embodiment, the entities in the sub-group which comprises the parent entities can monitor and/or control the communications of the child entities associated with them. Moreover, sub-groups can be added or released from the group as needed.

In one illustrative example, there is parent-child relationship between a P25 voice radio and a broadband handheld device. When a user presses a distress button or under normal operation mode—when voice group call starts on a P25 radio, the P25 radio sends a signal to the broadband handheld device to automatically start/join the same group as the P25 users and send streaming video/group message to the incident scene commander or the whole group. In the case of multiple users pressing the distress button simultaneously, the incident scene commander decides which video to broadcast to what group of users. Moreover, when a user has multiple devices with parent-child relationship, and the devices are running low on battery life, the parent device sends a notification to the child device to go into sleep mode and conserve battery life; the parent device meanwhile sends the location information and enables the communication. Further, when the parent device is near the end of battery life, it sends a wake-up signal to the child device, then the child device wakes up and enables communication as well as location information.

For instance, a fire chief's device (parent entity) can instruct, monitor, or control the firefighters device (child entities) associated with him. In another example, if the battery of one of the fire fighter (child entities) devices is low, then the fire chief's device (parent entity) may instruct the low battery fire fighter device to go to sleep. Also, the entities in the sub-group comprising the parent entities can share content (e.g., data, voice, video, and the like) which is not accessible to the child entities.

Regarding adding and removing sub-groups as needed, in the chemical explosion example, instead of the CAD system 150 dispatching EMS, the controller 162 selects EMS personnel from a nearby hospital to include in the group 110 and invites to the communication session devices associated multiple different emergency response groups that are located on different networks. For example one emergency response group (e.g., G1) is a medical response group that gets the incident info, let's say a head trauma. Emergency response G1 activates a child G1 group, which is a brain surgery personnel group. From this point in time, the child G1 receives all or selected information and is affiliated with other groups allocated to the events. The controller 162 manages all resources and links related to this incident. Moreover, as the incident ramps down, e.g., the injured person enters the emergency room; the relevant allocated resources and links are scaled down accordingly. G1 child group is taken out of the incident first followed by later release of the other groups involved.

As indicated above, in another embodiment, the controller applies the set of rules (configured rules and/or dynamic inputs) to modify (212) the communication group upon receiving (210) indication of a change in one of or a combination of the device characteristics parameters, user characteristics parameters, or network characteristics parameters. The change in the communication group could encompass, but is not limited to, adding or removing one or more entities from the group; modifying an entity priority or role; adding, removing, or modifying the content being distributed; modifying priority of content distribution; or modifying how the content is distributed (e.g., a change in the network used to send the content), or any combination of changes.

For example, the controller could change the voice codec rate based on network bandwidth availability. In addition, in cases where multiple networks are involved in a communication session for the group, the controller could transfer the entire session (or certain of the group members, or media being distributed within the session) between networks when availability of the currently selected network(s) crosses a low threshold. Decisions to migrate a session or parts of a session based on occurrence of events in the system (such as establishment of a temporary network at an incident scene) can occur automatically based on dynamic inputs and configured policy.

With respect to the chemical explosion incident, for instance, recall that initially the controller 162 initiates sending only low quality video to the laptops 128 and 138, respectively, in the ambulance and police car. However, in one implementation scenario, as the ambulance and police responders approaches, the controller 162 decides that the two crews are close enough to receive high quality video, which can be used to determine how to approach the scene (direction of smoke, fire or debris blocking street, etc.), and the controller 162 raises the priority of the crew members to receive the high quality video on laptops 128 and 138. The controller 162 also invites the P25 devices (122, 124, 126, 132, and 134) of the arriving ambulance and police crews to join the voice session.

Moreover, the fire chief determines that the public utilities need to be contacted, and they arrive on the scene. He orders that the public utility's role needs to be set to high priority to assist the fire department, so the controller 162 (upon receiving an indication of these changed parameters) initiates sending the high quality video stream to the utilities workers to aid them in evaluating the scene. Also, where the controller 162 is made aware (by the CAD system 150 or the fire chief) that firefighter 1 is with the chief, the controller 162 decides to only supply audio to the first firefighter's dual-mode device 144 to conserve system resources.

As the system approaches capacity (as determined by information that the controller 162 has received from the various networks), the controller 162 decides that the fire and public utility users should continue to receive high quality video since they are the highest priority users, and now that the ambulance is actually on the scene, their video flow on device 128 is pre-empted in order to assign those resources to the public utility users. After the fire chief assigns the police officers to a lower priority role of managing traffic, the controller 162 sends only audio and low quality video to the officers on their laptops 138, 172 to monitor the situation. Finally, as the incident winds down, the fire chief is summoned to a press conference and transfers his role of incident scene commander to the first firefighters As the fire chief leaves, the first firefighter becomes high priority again and receives a high quality video feed on his dual-mode device 144 via LTE. The fire chief's priority is reduced, and he receives only low quality video.

Thus, using the teachings herein enables more efficient network operation and content delivery to a wide range of users and devices that have varying needs and requirements. The setup and ongoing modification of media delivery to the users allows agencies to better utilize network/system resources when extremely high demand in relatively small geographic areas typically limits the availability of critical resources (e.g. network bandwidth). Other network operations can be optimized and automated in order to efficiently manage the network based on a set of incoming information, a set of policies, and a range of potential outcomes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for forming a communication group of entities for content distribution related to an event, the method comprising:
   receiving a resource manager state generated for an emergency event, wherein the emergency event comprises an emergency situation or service request where responding workers are called to address the event;
   extracting, based on the resource manager state, a plurality of parameters that indicate resource availability; and
   applying a set of rules to the resource manager state and to the plurality of parameters to select multiple resources to form at least one communication group that is created in response to the emergency event and is based on a type of emergency event and a worker role associated with the emergency event, the communication group comprising a plurality of entities to distribute content related to the emergency event, and includes entities not limited to a location of the emergency event.

2. The method of claim 1, further comprising:
   receiving an indication of a change in the plurality of parameters; and
   modifying the at least one communication group based on the change in the plurality of parameters.

3. The method of claim 2, wherein modifying the at least one communication group comprises at least one of:
   adding or removing an entity;
   modifying an entity priority or role;
   adding, removing, or modifying the content;
   modifying priority of content distribution; or
   modifying how the content is distributed.

4. The method of claim 1 further comprising:
   receiving an indication of the emergency event; and
   sending a request to generate the resource manager state for the emergency event, wherein the resource manager state is received in response to the request.

5. The method of claim 4, wherein the indication of the emergency event comprises an indication generated by at least one of:
   a voice communication;
   pressing a button;
   activating a switch;
   a user interface; or
   a monitored parameter.

6. The method of claim 1, wherein the resource manager state comprises information indicating at least one of an event identifier, an event type, event priority, event related content, or non-network resource assignments based on the event type.

7. The method of claim 6, wherein the resource manager state further comprises information indicating at least one group of entities.

8. The method of claim 1, wherein the plurality of parameters that indicate resource availability comprises at least one of a device characteristics parameter, a user characteristics parameter, or a network characteristics parameter.

9. The method of claim 8, wherein the device characteristics parameter indicates at least one of a device capability, a device battery state, a device identity, a device availability, a device location, or an association between a plurality of devices.

10. The method of claim 8, wherein the network characteristics parameter indicates at least one of network service capability, network transport capability, network capacity, network reliability, network security level, network availability, cost of network transport, network data speed, or quality of network transport.

11. The method of claim 8, wherein the user characteristics parameter indicates at least one of user availability, a user identity, a user location, user priority, group priority, user credentials, user state, or a user role.

12. The method of claim 1, wherein the selected resources comprise multiple networks to distribute the content.

13. The method of claim 1, wherein applying the set of rules further comprises prioritizing at least one of the plurality of parameters based on the set of rules.

14. The method of claim 1, wherein the multiple entities are selected to optimize the distribution of the content within the at least one communication group.

15. The method of claim 1, further comprising:
   updating the resource manager state generated for the emergency event.

16. The method of claim 1, wherein the resource manager state comprises one of a computer aided dispatch (CAD) state, a work order management system state, or a customer service system state.

17. A system for selecting resources to form a communication group for content distribution related to an emergency event, the system comprising:
   a controller comprising:
      an interface for receiving and updating a resource manager state from a resource management system and for communicating with a set of networks, wherein the resource manager state is related to an emergency event comprising an emergency situation or service request where responding workers are called to address the emergency event,
      a processor coupled to the interface for extracting, based on the resource manager state, a plurality of parameters that indicate resource availability and applying a set of rules to the resource manager state and to the plurality of parameters to select multiple resources to form at least one communication group that is created in response to the emergency event and is based on a type of emergency event and a worker role associated with the emergency event, the communication group comprising a plurality of entities to distribute content related to the emergency event, and includes entities not limited to a location of the emergency event; and
   a memory for storing the plurality of parameters and the set of rules.

18. A computer-readable storage element having computer readable code stored thereon for programming a computer to perform a method for forming a communication group of entities for content distribution related to an emergency event, the method comprising:
  receiving and updating a resource manager state generated for an emergency event, wherein the resource manager state is related to an emergency event comprising an emergency situation or service request where responding workers are called to address the emergency event;
  extracting, based on the resource manager state, a plurality of parameters that indicate resource availability; and
  applying a set of rules to the resource manager state and to the plurality of parameters to select multiple resources to form at least one communication group that is created in response to the emergency event and is based on a type of emergency event and a worker role associated with the emergency event, the communication group comprising a plurality of entities to distribute content related to the emergency event, and includes entities not limited to a location of the emergency event.

* * * * *